(12) United States Patent
Reichman et al.

(10) Patent No.: US 8,484,064 B2
(45) Date of Patent: Jul. 9, 2013

(54) SYSTEM AND METHOD FOR FINANCING PROMOTIONAL SERVICES

(75) Inventors: Arnold Reichman, Brooklyn, NY (US); Alessandro Papa, Brooklyn, NY (US)

(73) Assignee: LifeBooker, LLC, Brooklyn, NY (US)

( * ) Notice: Subject to any disclaimer, the term of this patent is extended or adjusted under 35 U.S.C. 154(b) by 0 days.

(21) Appl. No.: 13/486,454

(22) Filed: Jun. 1, 2012

(65) Prior Publication Data
US 2012/0245971 A1    Sep. 27, 2012

Related U.S. Application Data

(63) Continuation-in-part of application No. 13/243,010, filed on Sep. 23, 2011, which is a continuation of application No. 13/098,984, filed on May 2, 2011.

(60) Provisional application No. 61/330,356, filed on May 2, 2010, provisional application No. 61/405,817, filed on Oct. 22, 2010.

(51) Int. Cl.
*G06Q 10/00* (2012.01)
*G06Q 30/00* (2012.01)

(52) U.S. Cl.
USPC ..... 705/7.19; 705/7.31; 705/7.35; 705/14.23; 705/14.24

(58) Field of Classification Search
USPC ............... 705/7.19, 7.31, 7.35, 14.23, 14.24
See application file for complete search history.

(56) References Cited

U.S. PATENT DOCUMENTS

| | | | |
|---|---|---|---|
| 5,502,636 A | 3/1996 | Clarke | |
| 5,860,067 A | 1/1999 | Onda et al. | |
| 5,877,759 A | 3/1999 | Bauer | |
| 5,877,760 A | 3/1999 | Onda et al. | |
| 5,943,051 A | 8/1999 | Onda et al. | |
| 6,018,343 A | 1/2000 | Wang et al. | |
| 6,278,456 B1 | 8/2001 | Wang et al. | |
| 6,317,722 B1 | 11/2001 | Jacobi et al. | |
| 7,328,406 B2 | 2/2008 | Kalinoski et al. | |
| 7,483,846 B1 | 1/2009 | Kumar et al. | |
| 7,552,393 B2 | 6/2009 | Hayes-Roth | |
| 7,757,176 B2 | 7/2010 | Vakil et al. | |
| 8,060,395 B1 | 11/2011 | Frasher et al. | |
| 2002/0116348 A1* | 8/2002 | Phillips et al. | 705/400 |
| 2003/0061087 A1 | 3/2003 | Srimuang | |
| 2004/0215517 A1* | 10/2004 | Chen et al. | 705/14 |
| 2005/0234786 A1* | 10/2005 | Aggarwal | 705/30 |

(Continued)

OTHER PUBLICATIONS

Albrecht, "Accounting: Concepts and Applications," 2008, Thomson South-Western, pp. 289, 293-296, 309, 314, 862.*

(Continued)

*Primary Examiner* — Justin M Pats
*Assistant Examiner* — Ivan R Goldberg
(74) *Attorney, Agent, or Firm* — Arent Fox LLP

(57) ABSTRACT

Disclosed are systems, methods and computer program products for online marketing, scheduling and booking of service appointments as well as financing of promotional services. In one example, the system enables a service promoter and a service provider to execute a secured financing transaction pursuant to which a service promoter provides an agreed upon amount of monetary funds to a service provider in exchange for the right to promote to users a plurality of service offers from the service provider. The system then promotes service offers from the service provider and facilitates booking of service appointments for users with a service provider based on promoted service offers.

26 Claims, 14 Drawing Sheets

U.S. PATENT DOCUMENTS

| | | | |
|---|---|---|---|
| 2007/0075136 A1* | 4/2007 | Jacob | 235/383 |
| 2007/0150354 A1* | 6/2007 | Walker et al. | 705/14 |
| 2007/0156513 A1* | 7/2007 | Mastrianni et al. | 705/14 |
| 2007/0260636 A1 | 11/2007 | Baio et al. | |
| 2008/0033862 A1* | 2/2008 | Ehsani | 705/37 |
| 2008/0065565 A1 | 3/2008 | Walker et al. | |
| 2008/0126239 A1 | 5/2008 | Banbury et al. | |
| 2008/0177826 A1 | 7/2008 | Pitroda | |
| 2008/0183868 A1* | 7/2008 | Singh et al. | 709/225 |
| 2008/0281702 A1 | 11/2008 | Kirkwood | |
| 2008/0312962 A1 | 12/2008 | Kirkwood | |
| 2009/0125380 A1* | 5/2009 | Otto et al. | 705/10 |
| 2009/0144130 A1* | 6/2009 | Grouf et al. | 705/10 |
| 2010/0070296 A1 | 3/2010 | Massoumi et al. | |
| 2010/0070297 A1 | 3/2010 | Kharraz Tavakol et al. | |
| 2010/0070303 A1 | 3/2010 | Massoumi et al. | |
| 2010/0094680 A1* | 4/2010 | Ellis et al. | 705/9 |
| 2010/0125490 A1 | 5/2010 | Kiciman et al. | |
| 2010/0228564 A1 | 9/2010 | Kharraz Tavakol et al. | |
| 2011/0093318 A1* | 4/2011 | Guday et al. | 705/14.13 |
| 2011/0153396 A1* | 6/2011 | Marcuvitz et al. | 705/14.2 |
| 2011/0173102 A1 | 7/2011 | Burns et al. | |
| 2011/0191122 A1 | 8/2011 | Kharraz Tavakol et al. | |
| 2012/0065989 A1 | 3/2012 | Massoumi et al. | |
| 2012/0109679 A1 | 5/2012 | Massoumi et al. | |

OTHER PUBLICATIONS

Baron, "Shelf Space Management When Demand Depends on the Inventory Level," 2010, pp. 1-13, Production and Operations Management Society, published online Dec. 7, 2010.*

Wiley, "GAAP 2008: Interpretation and Application of Generally Accepted Accounting Principles," 2007, John Wiley & Sons, pp. 76, 77, 78, 185, 348.*

Qu, "Advance Selling and Internet Intermediary—Travel Distribution Strategies in the e-Commerce Age," 2007, ICEC '07, pp. 177-184.*

Bhargava, "Stockout Compensation: Joint Inventory and Price Optimization in Electronic Retailing," 2006, INFORMS Journal on Computing, vol. 18, No. 2, pp. 255-266.*

Lifebooker, (Lifebooker website, http://www.lifebooker.com, retrieved from Internet Archive, dated Apr. 16, 2008, Jul. 15, 2008, Feb. 8, 2009, and Apr. 2, 2009.

Marketing Weekly News, "Lifebooker: Lifebooker 2.0 Offers Beauty on a Budget During Tight Times," Feb. 14, 2009, Marketing Weekly News, p. 58.

* cited by examiner

SYSTEM AND METHOD FOR FINANCING PROMOTIONAL SERVICES

CROSS-REFERENCE TO RELATED APPLICATIONS

This application is a continuation-in-part of U.S. application Ser. No. 13/243,010 filed Sep. 23, 2011, which is a continuation of U.S. application Ser. No. 13/098,984, filed May 2, 2011, which claims benefit of priority under 35 U.S.C. 119(e) to Provisional Applications Nos. 61/330,356 filed May 2, 2010 and No. 61/405,817 filed Oct. 22, 2010, all of which are incorporated by reference herein.

TECHNICAL FIELD

This present disclosure relates generally to the field of electronic commerce and marketing, and, more specifically, to systems, methods and computer program products for financing of promotional services through a Web-based marketing system.

BACKGROUND

Marketing of goods and services has traditionally been done through television, newspapers, radio and direct mail marketing campaigns. The growth of the World Wide Web (hereinafter "Web") and Internet communications provided additional marketing options. For example, numerous Web-based marketing systems provide online advertising including contextual ads on search engine results pages, banner ads, blogs, Rich Media Ads, Social network advertising, interstitial ads, online classified advertising, advertising networks and e-mail marketing, including e-mail spam. However, the ubiquitousness and pervasiveness of online ads has resulted in consumers' aversion and distrust in the advertised content. To address this problem, Web-based marketing systems have been developed that, instead of imposing their ad content on consumers, allow consumers to search for the desired service promotions.

SUMMARY

Disclosed is a Web-based marketing system operated by a service promoting company (hereinafter "service promoter") for promoting (e.g., advertising) services to system users and other consumers. In one example embodiment, the system provides Web-based customizable calendars that service providers can use to create schedules of available services and discounts, which are fed into a consumer-accessible online advertising marketplace, which is a directory/listing of available service offers and associated available appointment times. System users can search service offers advertised in the online marketplace and schedule and book appointments with service providers through the Web-based marketing system.

In another example embodiment, the system provides targeted e-mail marketing of available service offers to consumers. Particularly, the system periodically generates electronic promotional certificates, which include discounted service offers from various service providers and e-mails them to selected user(s). The users may be selected based on their history of using the promoted service(s) or other criteria. The user can activate a hyperlink in the promotional certificate, which will direct the users Web browser application to the user interface of the marketing system. The interface will allow the user to view a schedule of available service appointments associated with the promoted service offer and book a service appointment with a service provider. In one example embodiment, the marketing system also enables the service promoter to finance promotion of service offers. Particularly, the service promoter and a service provider may enter into and execute a secured financing transaction pursuant to which a service promoter provides (e.g., transfers, wires, gives a check) an agreed upon amount of monetary funds to a service provider in exchange for the right to promote to consumers a plurality of service offers from the service provider. The information about the transaction is stored in a system's database, including information about the amount of transferred funds, the number of available servicer offers obtained from the service provider, and the cost of each service offer to the service promoter. In one example, the secured, financing transaction may be a collateral-secured loan from the service promoter to the service provider, wherein the collateral for the loan includes a plurality of service offers obtained from the service provider. In another example, the secured financing transaction may be an advanced purchase by the service promoter of a plurality of service offers from the service provider, wherein the transferred funds are the purchase price.

Once the secured financing transaction has been executed, the marketing system may generate and send to users promotional certificates for the service offers. Alternatively, the marketing system may offer the service offers through the online advertising marketplace. Upon receiving from a user a request for booking of a service appointment based on a promoted service offer and/or payment of the price specified in the service offer for the booked appointment, the marketing system automatically adjusts (e.g., decreases) the number of available service offers by the number of service offers corresponding to the number of booked service appointments and deducts from the amount of transferred funds the amount of the total cost of service offers corresponding to the number of booked service appointments. In the event a user cancels a booked appointment with the service provider or the service provider fails to render services in accordance with the service offer, the system will reverse the changes previously made to the transaction information by increasing the number of available booking offers and adding the cost of the unfulfilled service offer to the amount of the transferred funds. Thus, when the number of the available service offers and the amount of transferred funds both become zero the secure financing transaction is deemed to be completed. In one example embodiment, the marketing system provides a web-based service provider interface that allows service providers to request funding from a service promoter in exchange for the right to promote to consumers a plurality of service offers from the service provider. The marketing system is operable to analyze booking records associated with the service provider that are maintained by the service promoter. The booking records include information about the number of service appointments historically booked by consumers for service offers from the service provider and the prices paid by consumers for the booked service appointments from the service provider. The system then determines, based on the analysis of the booking records, the amount of funds to be provided by the service promoter to the service provider, the number of service offers that can be promoted/sold by the service promoter, and the cost of each service offer to the service promoter. The system then executes a secured financing transaction between the service promoter and the service provider pursuant to which the service promoter transfers the determined amount of funds to the service provider in exchange for the right to promote to consumers the determined number of service offers from the service provider. Finally, the information about the transaction, including the amount of transferred funds, the determined number of available service offers, and the cost of each service offer to the service promoter, is stored in a system database.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments and, together with the detailed description serve to explain their principles and implementations.

In the drawings:

FIGS. 3A and 3B illustrate example embodiments of a discounting tool.

FIG. 4 illustrates one example embodiment of a service user interface.

FIG. 5 illustrates one example embodiment of a calendar-based user interface.

DETAILED DESCRIPTION OF EXAMPLE EMBODIMENTS

Example embodiments are described herein in the context of systems, methods and computer program products for online marketing, discounting, scheduling and booking of services using a Web-based marketing system and, in particular, a calendar application implemented therein. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
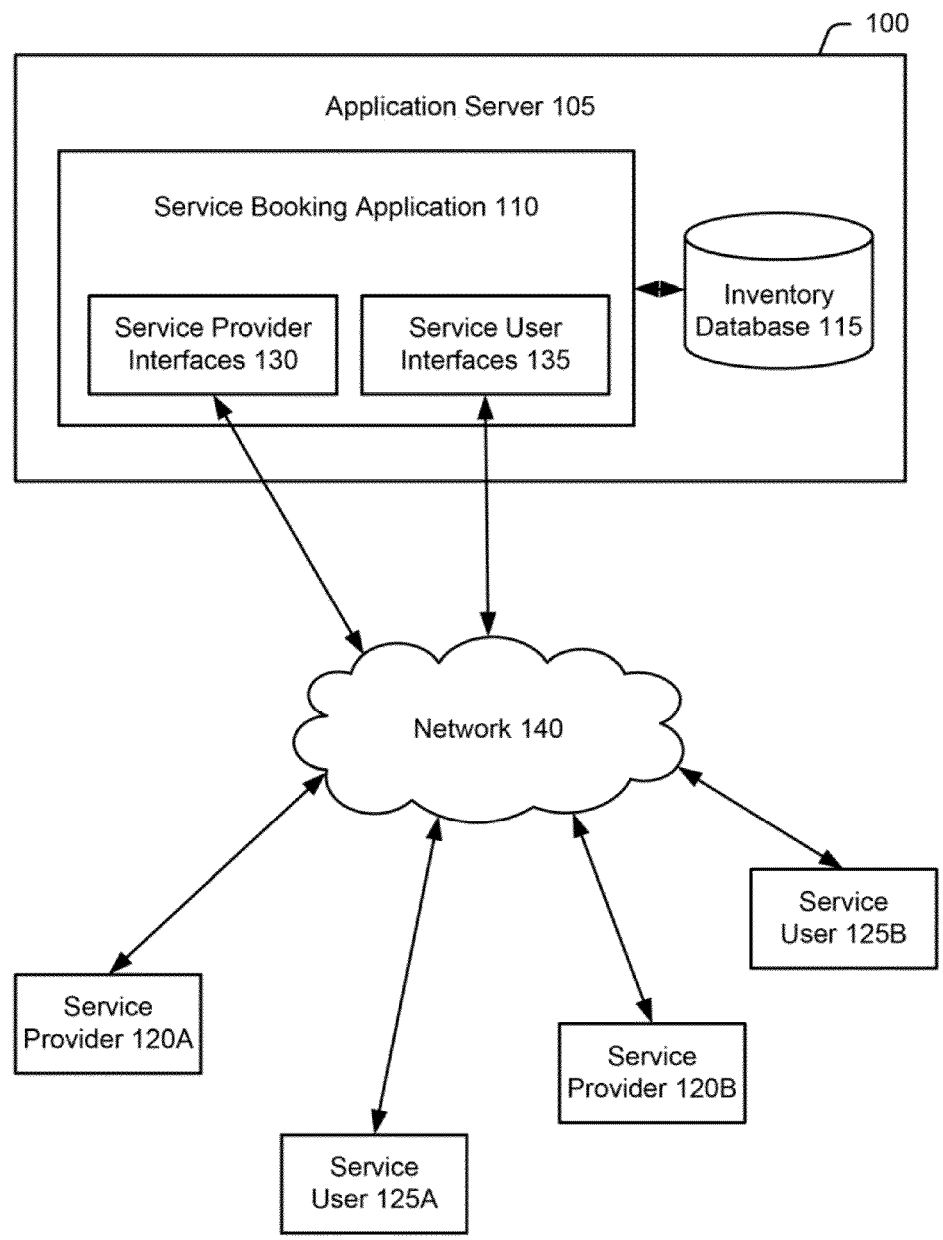
FIG. 1 illustrates one example embodiment of a Web-based marketing system.

FIG. 1 depicts one example embodiment of a Web-based marketing system. As shown, system 100 includes an application server 105 that hosts a service booking application 110 and associated services inventory database 115 storing a schedule of booked and available service offers associated with computers of service providers 120A and 120B and service users 125A and 125B. (Service provider(s) and service user(s) will also be indicated generally by the reference numerals 120 and 125, respectively.) The server 105 is accessible via a network 140, such as the Internet, by computers of service providers 120 and users 125.

Service providers 120 may include, but are not limited to, beauty salons, health spas, sports clubs, barber shops and other local businesses (i.e., service providers) that provide services to clients (i.e., service users) with associated appointments. In one example embodiment, system 100 provides a customizable Web-based service provider interface 130 to providers 120 by means of which a provider can create a schedule of available service offers by service, practitioner, date, time or other criteria. In another example embodiment, system 100 provides a Web-based user interface 135 to users 125 for searching availability, discounts, and ratings of available services and booking one or more appointments with service providers 120.

It should be noted that in another embodiment some of the functionality of the booking application 110, including but not limited to, provider and user interfaces 130 and 135, may be implemented as applications directly on the computers of the service providers 120 and service users 125. In this case, the inventory database 115 may be maintained on a remote server hosted by the booking application developer or in the cloud, such as Amazon® Elastic Compute Cloud. It should be also noted that in various embodiments, computers of the service providers 120 and service users 125 may include, but not limited to, personal computers, laptops, netbooks, tablets, digital media players, personal digital assistants, smart phones, or other types of digital communication devices connected to the Internet.

Figure 2:
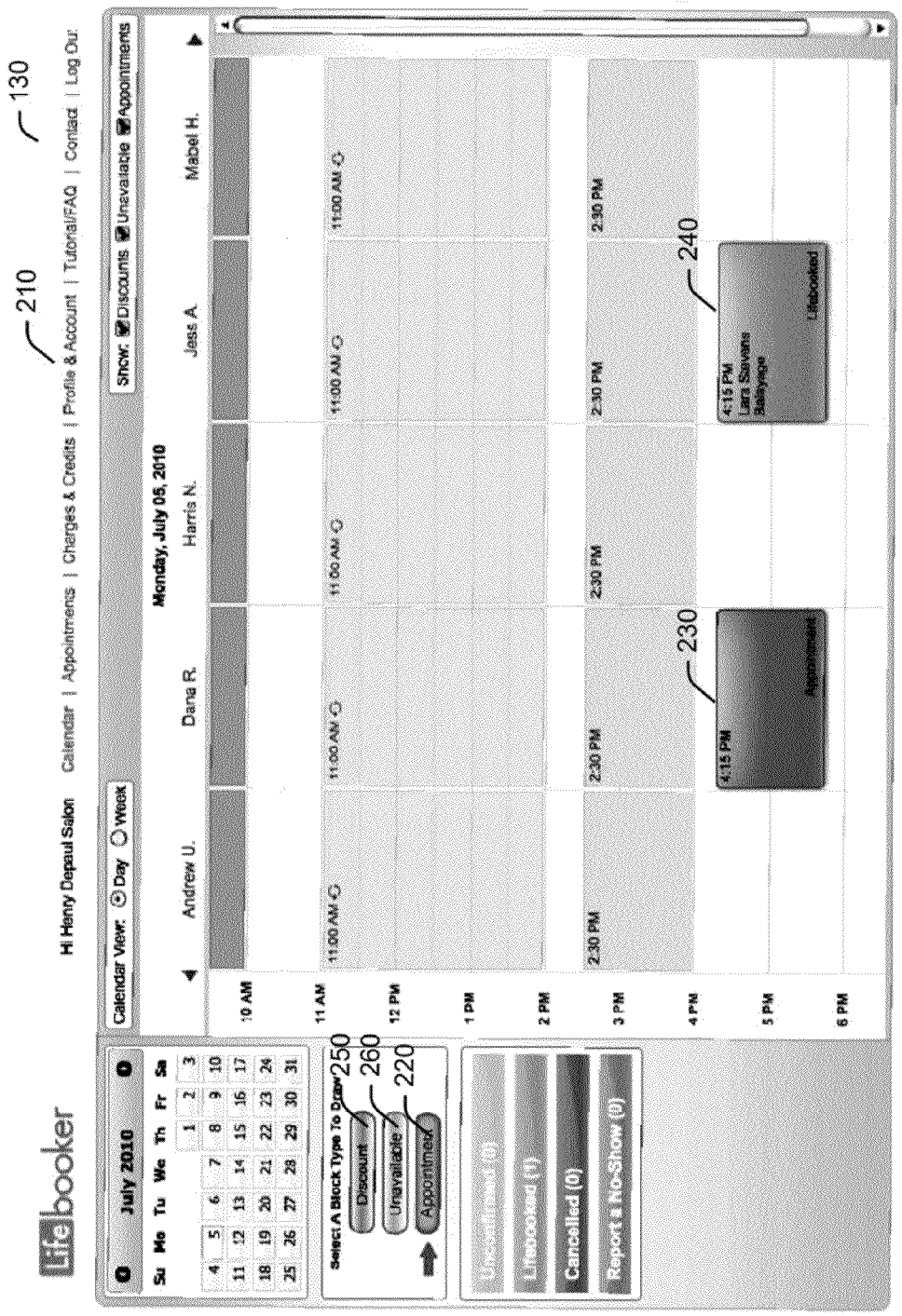
FIG. 2 illustrates one example embodiment of a service provider interface.

FIG. 2 shows an example embodiment of a calendar-based service provider interface 130 of the application 110. Using this interface, service providers 120 can register/access the online booking application 110, create profiles and accounts 210, create/view schedules of appointments 220, enter discount information 250 and perform other functions. The registration/access process may involve creating user name and password, providing contact information, providing service menus, providing billing information and the like. The business profile 210 can be used to enter information about the business in general, about available practitioners, and about the types of available services. The business account may be used to view all information maintained by the booking application 110.

The service provider 120 may also use interface 130 to enter/update/view appointment scheduling information 220. In one example embodiment, service appointments may be made by service users 125 through the service user interfaces 135 and displayed as an appointment block in the appropriate year/month/date/time slot of the calendar-based service provider interface 130. In another example embodiment, the application 110 can interface with third-party scheduling technologies and calendars, such as MindBody Inc., SpaBooker®, Google® Calendar and Microsoft® Outlook®, via dedicated XML APIs to provide business profile information and pull availabilities from those calendars into the service, provider interface 130 and to push appointments booked by system users through the application 110. This embodiment exemplifies the publishing functionality of the application 110 as it moves availabilities from a pure calendaring system (i.e. Google® Calendar) into the Web-based marketing system 100.

As shown in FIG. 2, the calendar-based service provider interface 130 shows a daily operating schedule of Henry Depaul Beauty Salon for Jul. 5, 2010. As shown, there are five (or more) practitioners working on that day, including Andrew U., Dana R., Harris N., Jess A. and Mabel H. They are available for appointments from 10 am to 7 pm. The interface 130 also shows that service providers Dana R. and Jess A. have two scheduled appointments 230 and 240 at 4:15 PM. Dana R. was booked directly through the Salon. Jess A. was booked via the booking application 110. The directly or indirectly booked appointments 230 and 240, respectively, can be designated, for example, using different colors. The appointment blocks 230 and 240 can indicate the names of the users/clients that made these appointments and other information. Since appointment block 230 was made directly through the Salon, and not through the booking application 110, information about this appointment could have been entered manually by the service provider 120 or pulled automatically by the application 110 into the service provider interface 130 from the third-party scheduling system used by the service provider 120. This appointment information may be shown both in the service provider interface 130 and in the service user interface 135, so that service users 125 know which time slots are available for booking and which have already been booked.

In one example embodiment, the service provider 120 can designate time blocks when one or more service providers are unavailable for appointments using "unavailable" tool 260. In the example in FIG. 2, all practitioners have been marked as unavailable from 2:30 PM to 4:00 PM, as shown by the shading. Unavailable blocks can also be pulled automatically by the application 110 into the service provider interface 130 from the third-party scheduling system used by the service provider 120.

In another example embodiment, service provider interface 130 allows service providers 120 to create real-time discounts for their services by practitioner, service, date, time or other criteria. For example, using a discount tool 250, service provider 120 can indicate in the calendar the days and times when service rates of one or more practitioners have been discounted. In the example in FIG. 2, all practitioners have discounted rates on Jul. 5, 2010 from 11 AM to 2 PM, as shown by shading.

Figure 3A:
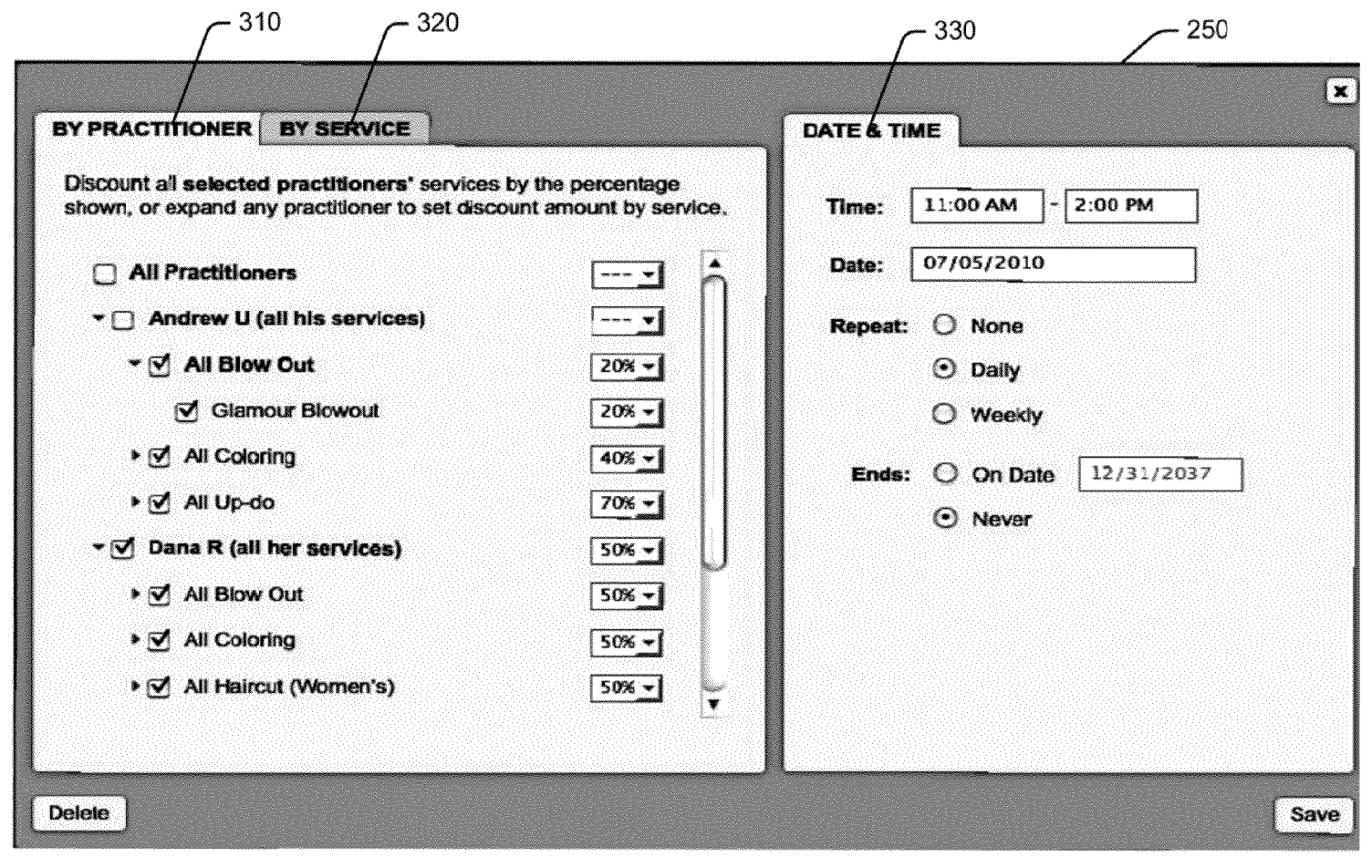

In one example embodiment, the discount tool 250 gives service providers 120 several different options for creating discount offers (also referred herein as "promotional offers"), such as by practitioner, by service, by date and time. FIG. 3A shows one example interface of the discount tool 250 that can be used for creating different discounts offers for different practitioners 310. As shown, the service provider 120 can set the same discount for all or different discounts for different practitioners. Furthermore, the discount offer may apply to all or specific services provided by each practitioner. For example, in case of Andrew U., a 20% discount is provided on glamour blowout services, and a 40% discount is provided on all coloring and all up-do services, while all services of Dana R. have a 50% discount offer.

Figure 3B:
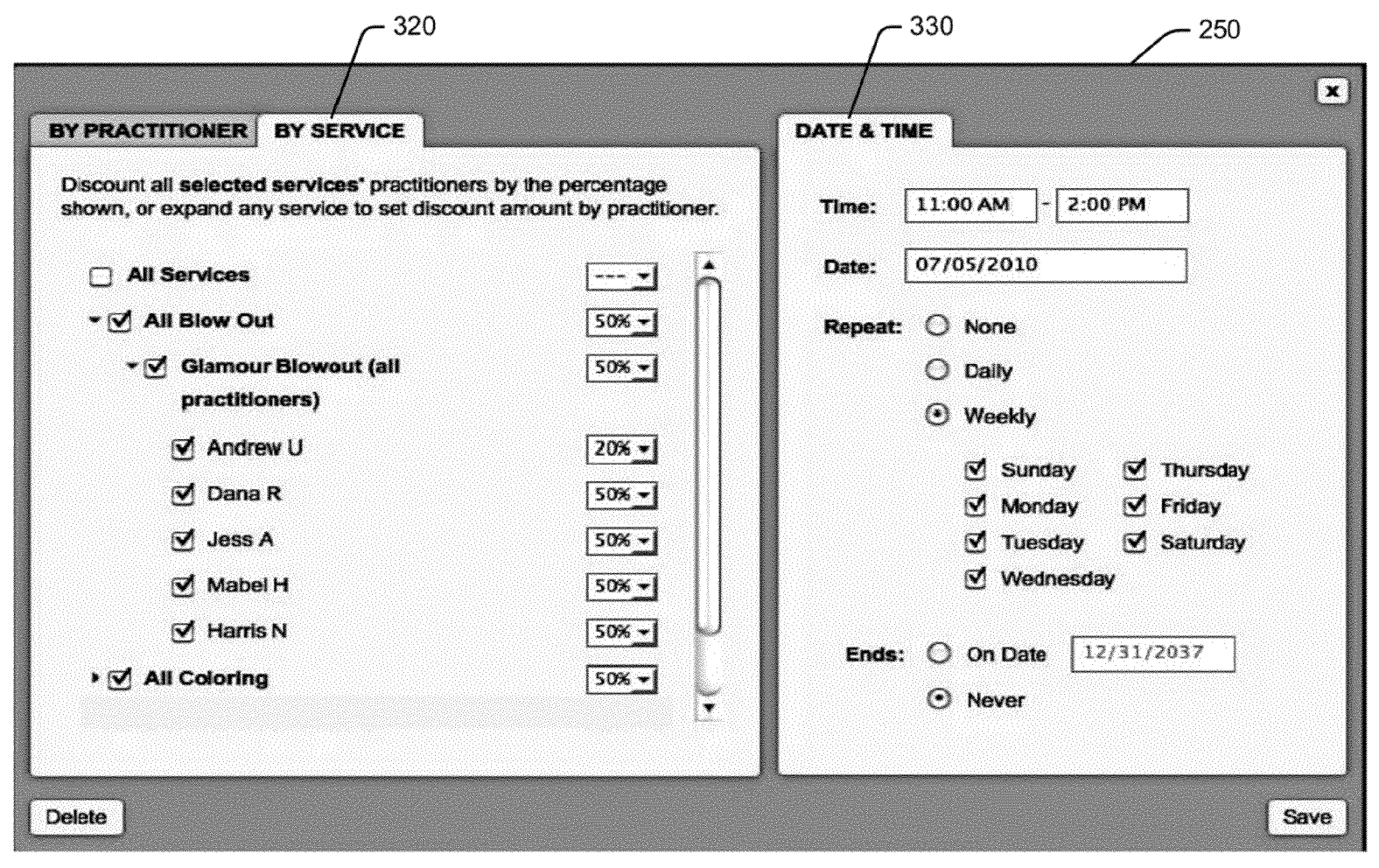

FIG. 3B shows another example interface of the discount tool 250 for creating discount offers for different services 320. As shown, the service provider 120 can set a single discount on all available services, or different discounts on subsets of services, such as all blowout services and all glamour blowout services. Furthermore, for each subcategory of service, the service provider 120 can indicate which practitioners have additional discounts, such as Jess A. has an additional 50% discount on glamour blowout services, while Andrew U. has an additional 20% discount on the same service.

In another example embodiment, the discount tool 250 also allows service providers 120 to specify the appointment date and time 330 when discount offers are made available to the service users. As shown in FIG. 3B, the discounts may be offered, for example, on particular days of the week, on particular dates/times or never end.

Yet in another example embodiment, the discount tool 250 allows service providers 120 to set a function that will automatically discount a single service or a group of services in an effort to maximize revenue to the business. The discount tool 250 can be configured to automatically increase or decrease discounts offered on a particular service or practitioner based on behavioral data and/or by an amount defined by the business (e.g., 10%) in predetermined time increments (e.g., weekly, daily or hourly) for particular blocks of time, to particular groups of user's (i.e., users new to the business, in a certain geography, etc.). To that end, the service provider may specify various business decision rules (or use business rules based on behavioral data provided by the booking application 110) that gradually adjust the rate of discount based on lack or excess of bookings of a particular service or practitioner on a particular day or time. For example, a sale on a particular service may start at a high discount, e.g., 80% at 9 AM, when business is generally slow. Then, the discount tool 250 will automatically decrease the rate of discount for an appointment time by, for example, 10% every hour on the hour, until the discount reaches 0% by the end of the day. In an alternative embodiment, a service provider 120 may manually adjust the offered discount without use of the discount tool 250. In addition, during each discount adjustment, the system 100 may advertise the current discount offers to a targeted group of users via email notification, banner ads, SMS messages, social media, and other types of advertising and communication means.

Once the schedule of available appointments and associated discounts are created by service providers 120 using interface 130, this information is stored in the account of the service provider 120 and fed into a common online marketplace of all available services and providers hosted by the booking application 110. This online marketplace is accessible to service users 125 via service user interfaces 135.

Figure 4:
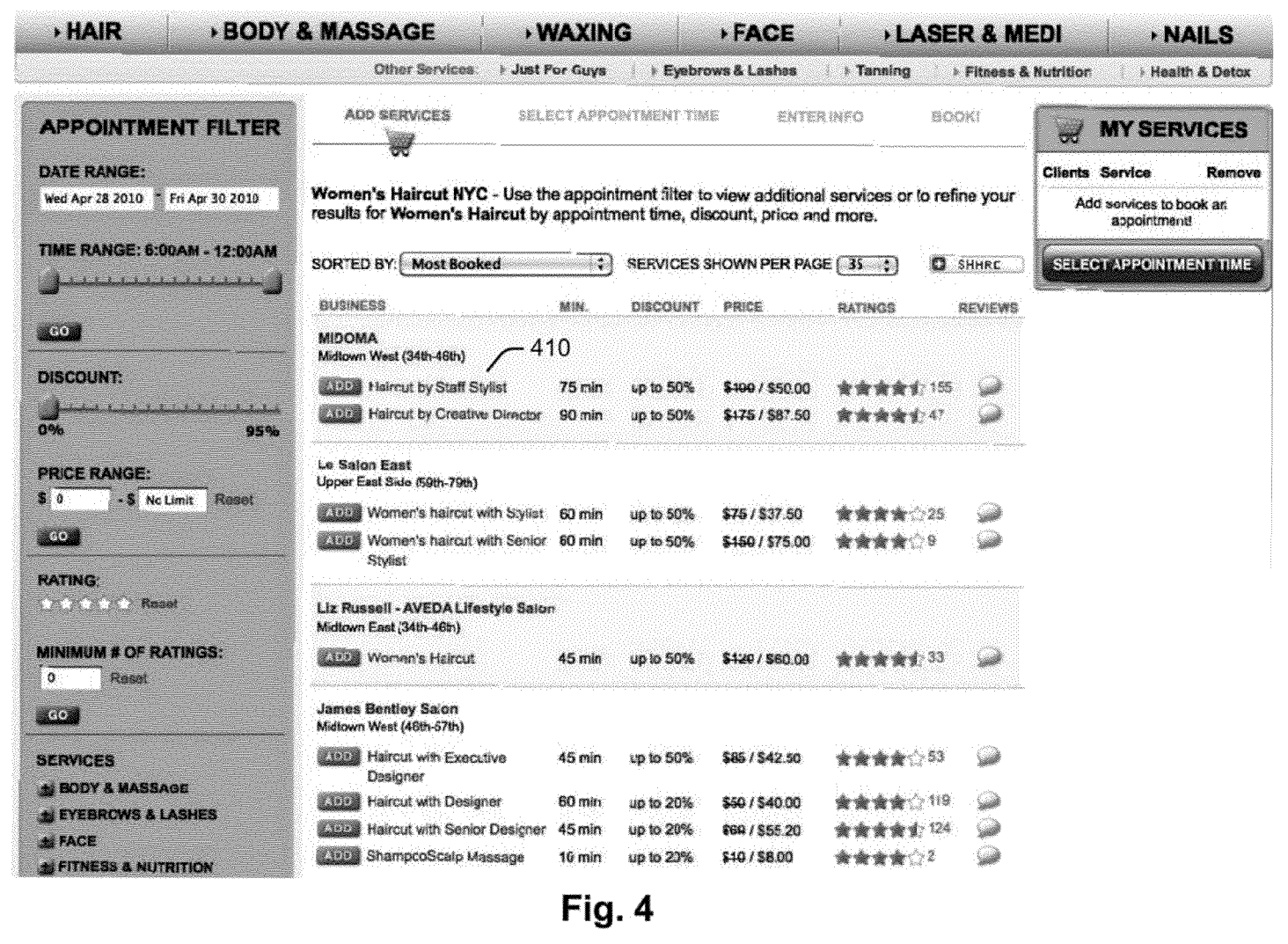

FIG. 4 shows one example embodiment of the service user interface 135. Using this interface, service users 125 can search the online marketplace for available appointments using service type, appointment date/time range, service rating, business location, discount amount, and/or price range. The booking application 110 searches its database of available services and displays a listing of service providers and available appointments for services matching the user-specified search criteria. For example, in response to a user searching for providers of women's haircuts in New York on April 28 through April 30, the booking application 110 displays several New York salons, which provide the requested service on the given dates, as well as the pricing and discount information specified by the service provider 120. The user can view detailed information about the service provider and book an appointment with the service provider by clicking on the specific entries 410 in the displayed list.

Figure 5:
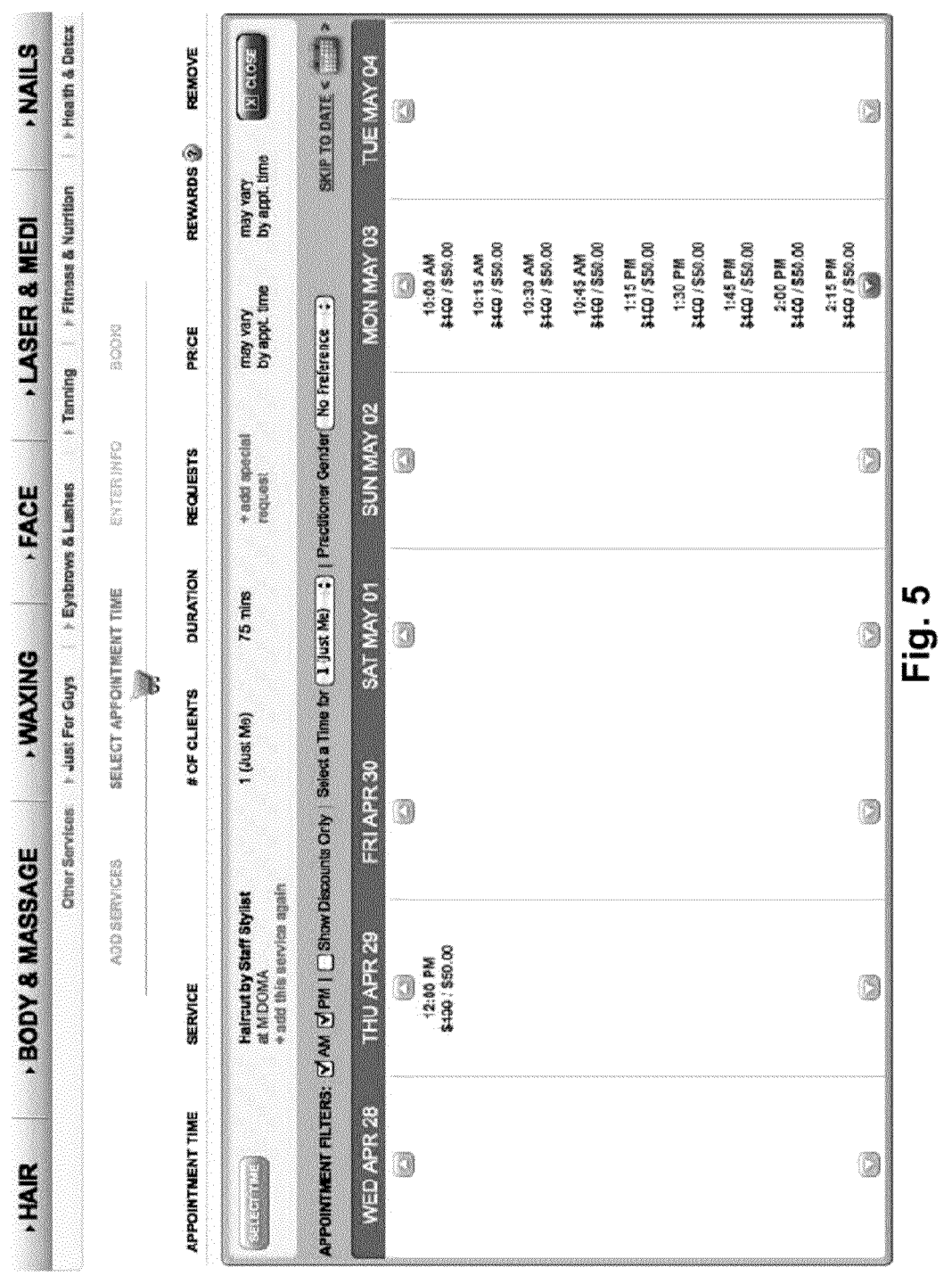

FIG. 5 shows an example embodiment of a calendar-based user interface 135 for one of the service providers listed in the search results list in FIG. 4. The interface shows a weekly view of available appointments for the service provider and the associated pricing and discount information for each appointment. Monthly and daily views of the available appointments information are also available. In the case where additional practitioner-specific discount information has been specified by the service provider 120, this information may also be displayed, so that the user 125 can make appointment selection based on all available discount information. Once the user selects one of the available appointments, the service provider account is updated to reflect that an appointment has been booked, as shown, for example, by block 240 in FIG. 2, and in email or SMS message can be sent to the user 125 or mobile device confirming this booking.

Figure 7:
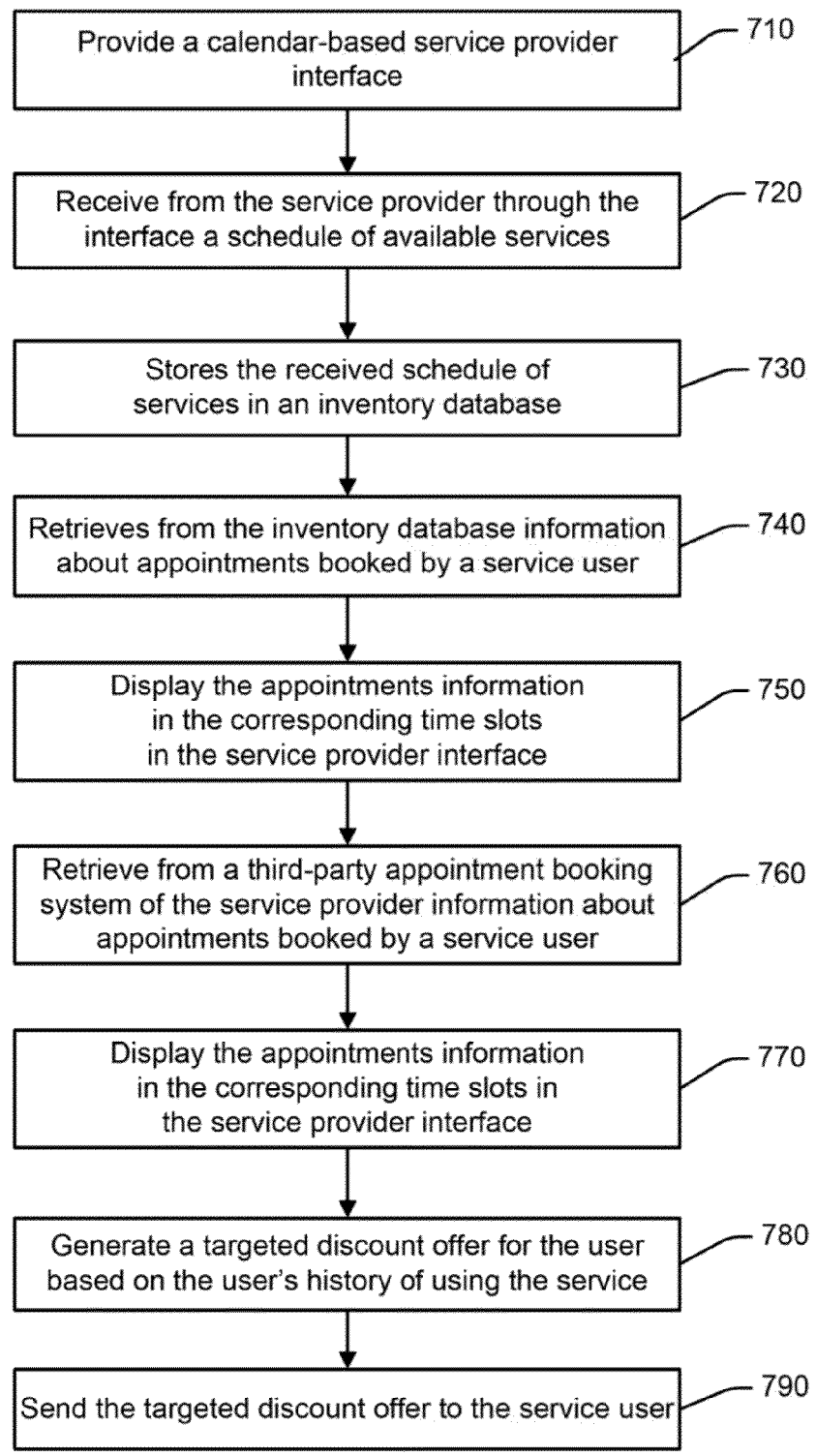
FIG. 7 illustrates one example embodiment of a method of operation of the online booking system.

FIG. 7 illustrates one example embodiment of a method of operation of the online booking application of the Web-based marketing system. At step 710, the application provides to a service provider a calendar-based service provider interface for creating a schedule of services provided by the service provider. At step 720, the service booking application receives from the service provider through the interface a schedule of available services, which includes the name of the service, the date and time when the service is provided, the name of the practitioner who performs the service, the price of the service and a discount offer. At step 730, the application stores the received schedule of services in an inventory database. At step 740, the application retrieves from the inventory database information about appointments booked by a service user with the service provider. At step 750, the application displays the appointment information in the corresponding time slots in the calendar-based service provider interface. At step 760, the application retrieves from a third-party appointment booking system of the service provider information about appointments booked by a service user. At step 770, the application displays the retrieved appointment information in the corresponding time slots in the calendar-based service provider interface. At step 780, the application generates a targeted discount offer for a service user based on, for example, the user's history of using the service or other discount recommendation criteria specified by the service provider. At step 790, the application electronically sends, e.g., by e-mail, the targeted discount offer (e.g., promotional certificate) to the service user. The generated targeted discount offer may be published in other ways as well, for example through the interstitial ads, pop-up ads, mobile ads sent to the user's mobile phone, or other online publishing mechanisms known in the art.

Figure 8:
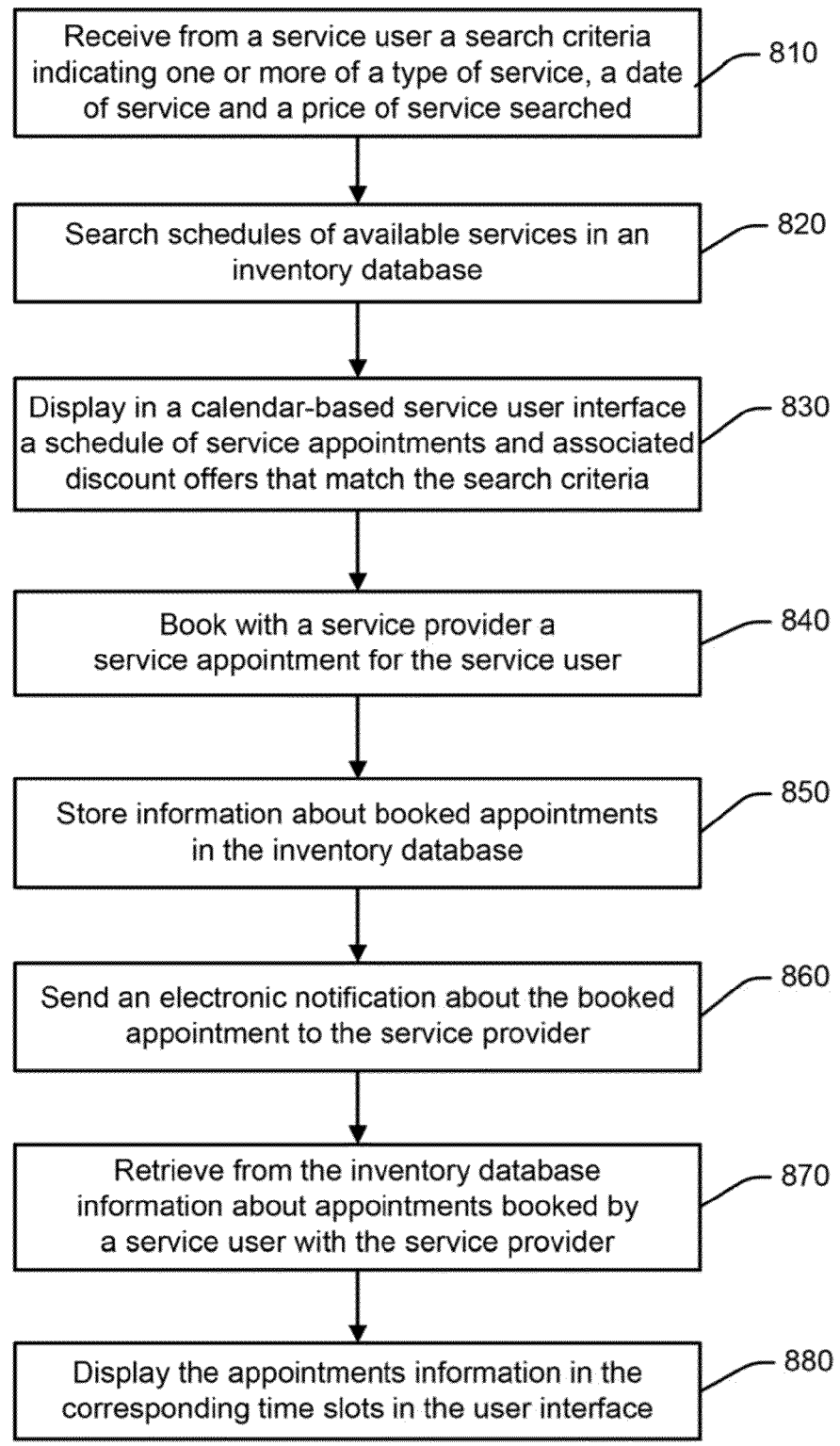
FIG. 8 illustrates another example embodiment of a method of operation of the online booking system.

FIG. 8 illustrates another example embodiment of a method of operation of the online booking application of the Web-based marketing system. At step 810, the application receives from a service user search criteria indicating one or more of a type of service, a date of service and a price of service searched by the service user. At step 820, the application searches schedules of available services in an inventory database. At step 830, the application displays in a calendar-based service user interface a schedule of available service appointments and associated discount offers that match the search criteria. At step 840, the application books with a service provider a service appointment for the service user. At step 850, the application stores information about booked appointments in the inventory database. At step 860, the application sends a notification about the booked appointment to the service provider and the user. At step 870, the application retrieves from the inventory database information about appointments booked by a service user with the service provider. At step 880, the application displays the appointments information in the corresponding time slots in the calendar-based service user interface.

In one example embodiment, the Web-based marketing system also enables the service promoter to finance promotion of service offers. Particularly, the service promoter and a service provider may enter into and execute a secured financing transaction pursuant to which a service promoter transfers an agreed upon amount of monetary funds to a service provider in exchange for the right to promote to users a plurality of service offers from the service provider. In one example, the secured financing transaction may be a collateral-secured loan from the service promoter to the service provider, wherein the collateral for the loan includes a plurality of service offers obtained from the service provider. In another example, the secured financing transaction may be an advanced purchase by the service promoter of a plurality of service offers from the service provider, wherein the transferred funds is the purchase price.

This secured financing transaction allows a service promoter to obtain service offers from service provider in bulk at a discounted rate and resell these service offers (also referred herein as units) to users at discount price. For example, the service provider may typically charge its customers $50 for a specific service (e.g., hair cut), but may be willing to "sell" a large number of service offers (e.g., units) to the service promoter at a reduced or discounted rate, e.g., $20 per unit. The service promoter will in turn advertise the service offers at a selected price, e.g., discounted price of $30 per unit, through the online advertising marketplace, via targeted emailing of promotional certificates to users or via SMS messages to users' mobile devices. The difference in price "paid" by the service promoter to the service provider for each service offer (e.g., $20) and the selected price at which the service promoter resells the service offer to the consumer (e.g., $30) is a profit margin of the service promoter.

Figure 9:
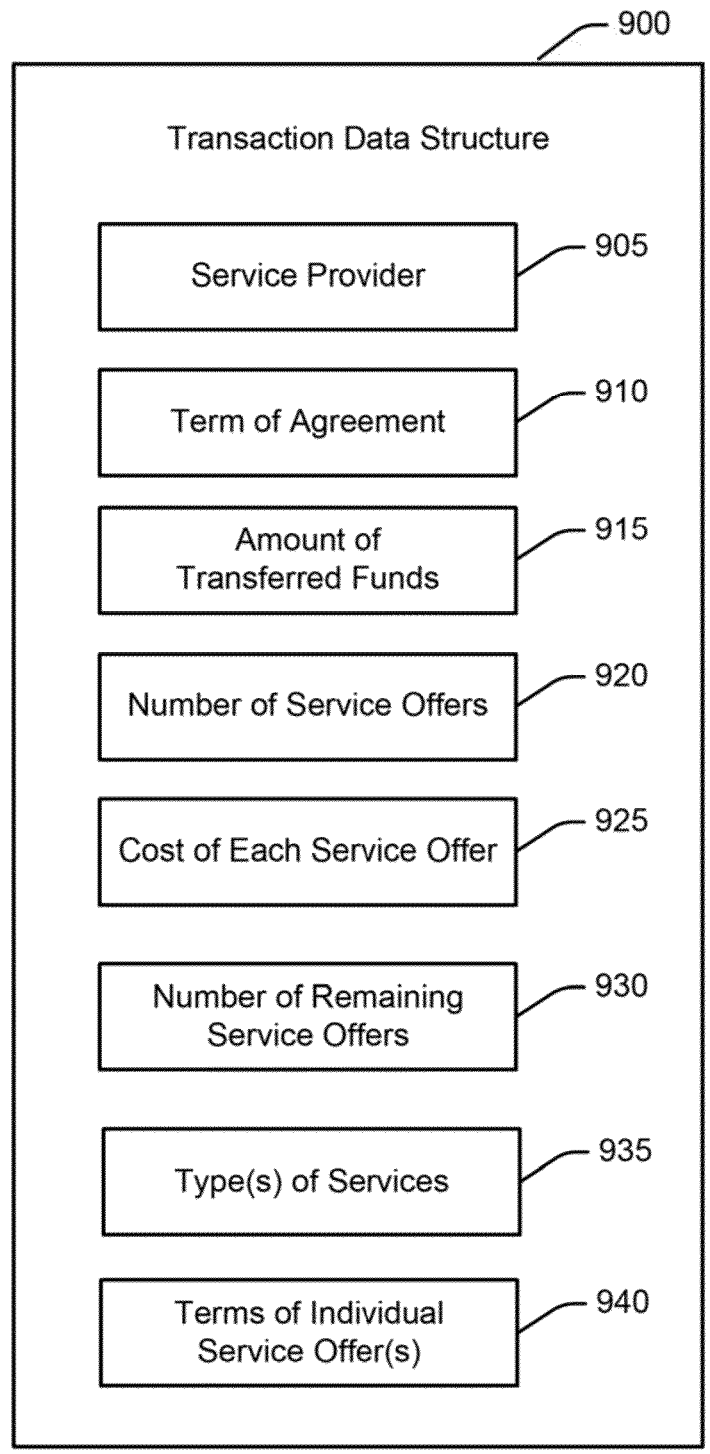
FIG. 9 illustrates an example embodiment of a data structure containing financing transaction-related information.

In one example embodiment, the information about the transaction is stored in the system database. FIG. 9 shows an example data structure 900 used to store transaction-related information in the inventory database 115 of the application server 105 of the marketing system 100 shown in FIG. 1. It should be noted that different data structures 900 may be created for different transactions negotiated between the service promoter and different service providers. As shown, transaction data structure 900 may include service provider identifier 710, such as name of the service provider. The term of agreement identifier 910 may be used to identify a period of time during which the service promoter may sell promotional certificates to users (e.g., six months from the date of execution of the agreement by parties). Amount of transferred funds 915 indicates the amount of money that was given by the service promoter to service provider (e.g., $10,000) (also referred, herein as loan amount, advancement or financing). The number of service offers 920 indicates the number of service offers (e.g., units) purchased by the service promoter from the service provider (e.g., 500 service offers). Cost of each service offer 925 indicates the cost of each service offer to the service promoter. The cost of each service offer 925 may be calculated by dividing the amount of transferred funds 915 by the number of service offers 920. Number of remaining service offers 930 is a variable which is automatically decreased by an amount, (e.g., one) each time a service offer is purchased by a user. Type(s) of service parameter 935 indicates exactly what type of servicer is associated with each service offer (e.g., one hour massage session, a man's haircut, a manicure, etc.). Terms of individual service offer(s) field 940 may list various terms negotiated between the service provider and service promoter for individual service offer(s), such as discount limits that can be offered by the service promoter for particular service offers, returns and reimbursement policies, etc. In other embodiments, there may be other transaction-related information that may be stored in the data structure 900, such as a counter of service offers returned by consumers and detailed terms associated with the service (e.g., length of service, whether the promotional price includes tax or tip, etc.).

Figure 6:
FIG. 6 illustrates one, example embodiment of a promotional certificate.

Once the secured financing transaction has been executed and information about the transaction is stored in the inventory database, the marketing system may promote the service offers to users through the online advertising marketplace, as described above with reference to FIGS. 4 and 5. Alternatively, the marketing system may generate and send to users promotional certificates for the service offers. FIG. 6 shows a sample promotional certificate that can be generated and distributed by the service promoter pursuant to the financing transaction. Each promotional certificate may identify one or more different service offers, as shown in FIG. 6. The promotional certificate may be sent to one or more users based on user's prior history of using the promoted services, users' reviews or other criteria. For example, the system may identify what users have booked before, looked at, indicated as being interested in, the number of times they returned to a particular business, and other criteria to determine what services should be advertised to the users 125. The promotional certificates can be sent using e-mail, text messages (e.g., SMS), regular mail, or other means. The promotional certificates may be periodically sent to the users based on the date of their last appointment according to service category (e.g., 3 months for a woman's haircut, 30 days for bikini waxing, etc.).

In one example embodiment, an electronic promotional certificate may include at least one hyperlink, such as "book" button 610 in FIG. 6, which, when activated by user, redirects user's Internet browser to the Web-based calendar user interface 135 of the booking application 110 that will allow the user to select and book a service appointment for the service(s) offered in the promotional certificate. In another embodiment, each promotional certificate may include a unique booking code printed thereon (not shown), which the user can enter manually into the calendar user interface 135 of the booking application 110 to book service appointments with the service provider.

Upon receiving from a user a request for booking of a service appointment based on a promoted service offer and/or payment of the price specified in the service offer for the booked appointment, the marketing system automatically decreases the number of available service offers by the number of service offers corresponding to the number of booked service appointments and deducts from the amount of transferred funds the amount of the total cost of service offers corresponding to the number of booked service appointments. In the event a user cancels a booked appointment with the service provider or the service provider fails to render services in accordance with the service offer, the system will reverse the changes previously made to the transaction information by increasing the number of available booking offers and adding the cost of the unfulfilled service offer to the amount of the transferred funds. Thus, when the number of the available service offers and the amount, of transferred funds both become zero the secure financing transaction is deemed to be completed.

Figure 10:
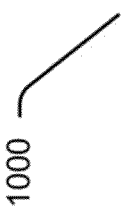
FIG. 10 illustrates one example embodiment of a service promoter interface for displaying financing transaction-related information.

As indicated above, the information about the status of the transaction is maintained and dynamically updated by the system in transaction data structure 900. The system allows service promoter to view information about the status of the transaction via a Web interface. FIG. 10 shows an example service promoter interface 1000 that shows one example view of information obtained from transaction data structure 900 about two different transactions: one transaction for lash extensions (70 set) service offer and second transaction for lash extensions (100 set) service offer, both from the same service provider. As shown, the Loan Amount field 1010 shows the information about the original amount of funds transferred by the service promoter to the service provider in connection with each transaction. The Outstanding field 1020 shows the outstanding balance of funds for each transaction. The Total Units field 1030 indicates the total number of service offers purchased by the service promoter from the service provider for each transaction. The Sold field 1040 indicates the number of units sold by the service promoter to users for each transaction. The Outstanding field 1050 indicates the number of units that were not sold or remaining for each transaction. The Returns field 1060 shows the number of service offers returned by users for each transaction. The above are several examples of fields with respect to the service promoter interface 1000 and there may be other types of fields in the interface 1000 showing other transaction related information.

As mentioned above, the service promoter may transact to obtain from the service provider service offers for different types of services (e.g., massage, haircut, blowout haircut, manicure, etc.). In this case, the marketing system will store in the transaction data structure 900 information about the number of available service offers of each type of service and the cost of each service offer to the service promoter. In addition, in one example embodiment, the service promoter may configure the marketing system to monitor the rate of bookings of service offers of different service types and automatically (or manually) vary the discount price of the service offers at which they are promoted to users based on such factors as the total number of remaining available service offers and the number of remaining available service offers of each type of service. For example, if originally the service promoter obtained from the service provider 100 service offers for haircut at a cost of $10 per unit, and, after a month of promotion, sold only 20% of service offers at a discount price of $25 each, the marketing system may automatically decrease the discount price to $15 per unit in order to give more incentive to users to purchase service offers from the service promoter. Alternatively, if the system determines that the discounted price of the service offers is too low, the system may automatically increase the discount price to the point where the price at which the service promoter sells the service offers to users is higher than the price offered by the service provider to its customers, provided that such price markup is permitted by terms of agreement.

In another example embodiment, the system may dynamically increase/decrease the number of promoted service offers of one type of service and proportionally decrease/increase the number of promoted service offers of another type of service based on the total number of remaining available service offers of each type of service. For example, if originally the service promoter obtained from the service provider 100 service offers for blowout haircuts and 100 service offers for hair coloring, and, after a month of promotion, sold 10% of haircut offers and 80% of coloring offers, the marketing system may automatically decrease the number of available haircut offers by 50% and increase the number of available coloring offers by 50% in order to increase the number of sales of the coloring offers with the possible result of lower sales of haircut offers.

In one example embodiment, the marketing system provides a web-based service provider interface that allows service providers to request funding from a service promoter in exchange for the right to promote to users a plurality of service offers from the service provider. Additionally, the system can automatically make funding offers to selected service providers that have a history of using the marketing system for promotion of their services. To that end, the marketing system is operable to analyze various booking records associated with the service provider as well as other public and private information available via the internet and online electronic databases. The booking records typically include information about the number of service appointments historically booked by users for service offers from the service provider and the prices paid by users for the booked service appointments. Other information that may be considered is the number of views of service offers from this service provider on the online advertising marketplace, etc.

Based on the analysis of the booking records and other criteria, the system determines the terms of the financing offer with the service provider, including the amount of financing (e.g., amount of funds), the number of service offers that can be promoted/sold by the service promoter, and the cost of each service offer to the service promoter. Upon review/acceptance of the financing offer by the service promoter, the system may automatically accept/extend and execute a secured financing transaction between the service promoter and the service provider pursuant to which the service promoter transfers the determined amount of funds to the service provider in exchange for the right to promote to users the determined number of service offers from the service provider. The system creates a transaction data structure for the executed transaction and stores therein information about the amount of transferred funds, the number of available service offers, and the cost of each service offer to the service promoter, the types of services and other information.

In another example embodiment, the marketing system is configured to automatically expose the inventory of service offers to third parties (other than users) who may be interested in purchasing in bulk the number of service offers from the service promoter. For example, a plurality of service offers may be offered for sale at a fixed price or through an auction with a starting minimum price and reserve price.

Figure 11:
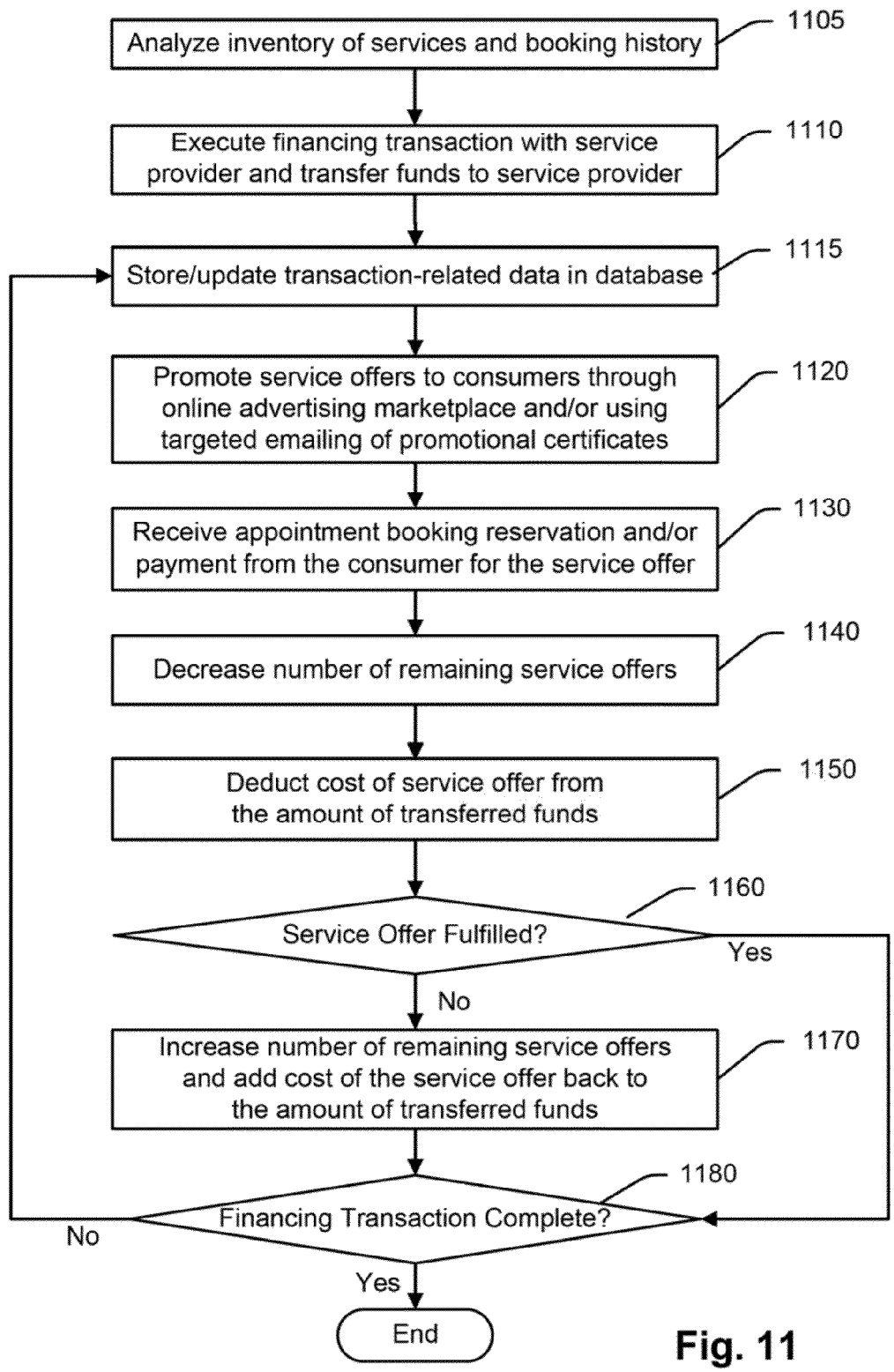
FIG. 11 illustrates one example embodiment of a method for financing promotional services.

FIG. 11 depicts one example embodiment of a method for financing promotional services using the marketing system disclosed herein. At step 1105, before extending or approving a financing offer to a service provider, the marketing system analyzes available inventory of services and past booking records associated with the service provider in order to determine the amount and range of services to be financed. The booking records may include information about the number of service appointments historically booked by users for service offers from the service provider and the prices paid by users for the booked service appointments. Based on the analysis of the booking records and other criteria, the system determines the terms of the financing offer with the service provider, including the amount of financing (e.g., amount of funds), the number of service offers that can be promoted/sold by the service promoter, and the cost of each service offer to the promoter.

Upon acceptance of the financing offer by the service provider, the system transfers the determined amount of funds from the service promoter to the service provider at step 1110 in exchange for the right to promote to consumers the determined number of service offers from the service provider. In addition, at step 1115, the system creates/updated a transaction data structure associated with the executed financing transaction and stores therein information about the amount of transferred funds, the number of available service offers, and the cost of each service offer to the service promoter, the types of services and other relevant information.

At step 1120, the system promotes discounted service offers to users. For example, the system may promote service offers through the online advertising marketplace. In addition or alternatively, the system may promote discounted service offers, emailing promotional certificates or pushing alerts related to promotional certificates or the availability of service offers to service users on mobile devices. As explained above, the certificates can be targeted to a selected group of users based on such information as history of customer's prior use of the promoted service or service provider and, where such information is available, the current location of users relative to the locations of the service providers. Each certificate may include information about the service offer, such as the identification of the service provider, description of the offered service and a discounted price of the service offer. In addition, each promotional certificate may also include at least one hyperlink to the booking application, which allows a user to redirect its Internet browser to the booking application and to book an appointment for the service offered in the promotional certificate.

At step 1130, the system receives a booking confirmation and/or electronic payment from the user for booking a service appointment for the service offered by the service provider using the booking application of the marketing system. At step 1140, the system decreases by one the number of remaining service offers in the transaction data structure (parameter 930 in FIG. 9). At step 1150, the system deducts the cost of the service offer from the amount of transferred funds in the transaction data structure (parameter 915 in FIG. 9). At step 1160, the system checks whether the booked service appointment has been canceled by the users or the service offer has not been fulfilled by the service provider according to the terms of the service offer. In case the offer was not fulfilled, at step 1170, the system will reverse the changes previously made to the transaction data structure by increasing the number of remaining service offers (parameter 930 in FIG. 9) and adding the cost of the unfulfilled service offer to the amount of the transferred funds (parameter 915 in FIG. 9). Finally, at step 1180, the system determines if the number of the available service offers and the amount of transferred funds in the transaction data structure both reached zero in which case the transaction is deemed to be complete and the process ends. If the transaction is not complete, the system updates parameters in the transaction data structure at step 1110.

Figure 12:
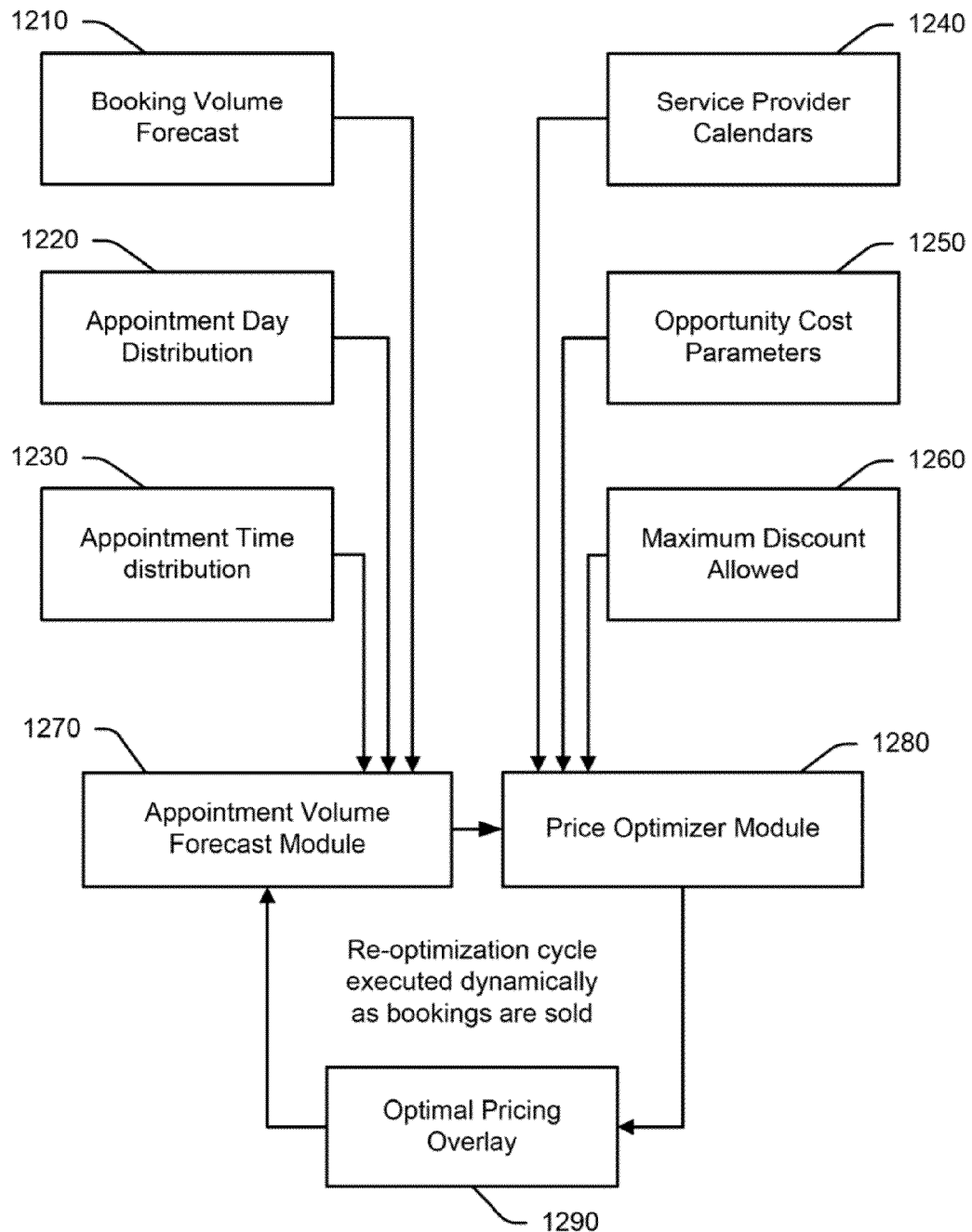
FIG. 12 illustrates one example embodiment of a method for optimizing pricing of service offers.

FIG. 12 displays one example mechanism implemented in the marketing system for dynamically optimizing pricing of service offers based on various information collected during system operation. Particularly, the system computes a booking forecast volume 1210, which is an estimate of total bookings by customers projected over, e.g., 1-2 week horizon based on the number of users, website traffic, day of the week, holiday schedule and other information collected by the system. The system also determines appointment day distribution 1220, which is an estimate of appointments by day based on number of days between booking day and appointment day. The system also determines appointment time distribution 1230, which is an estimate of distribution of appointments by time of day. All this information is fed into an appointment volume forecast module 1270, which analyzes the collected information to estimate the volume of expected bookings per day and time for the next 1-2 week period.

At the same time, the system collects information from service providers, including service provider calendar information 1240, which includes appointment availabilities by service, day and time for each service provider. The system also collects various opportunity cost parameters 1250, such as estimated walk-ins, cost of rendering services, etc. The system also collects information about maximum allowed discounts 1260 associated with each service and/or service provider. All this information, as well as appointment volume forecast data from module 1270 is fed into a price optimization module 1280, which optimizes pricing of service offers based on profit maximization, and outputs optimal pricing information 1290 for each type of service offer promoted by the marketing system. In addition, the resulted optimized pricing information may be periodically (e.g., daily, weekly, monthly) fed back into the appointment volume forecast module 1270 along with newly available forecast data to perform a pricing re-optimization cycle and generate newly optimized, prices for promoted service offers.

Figure 13:
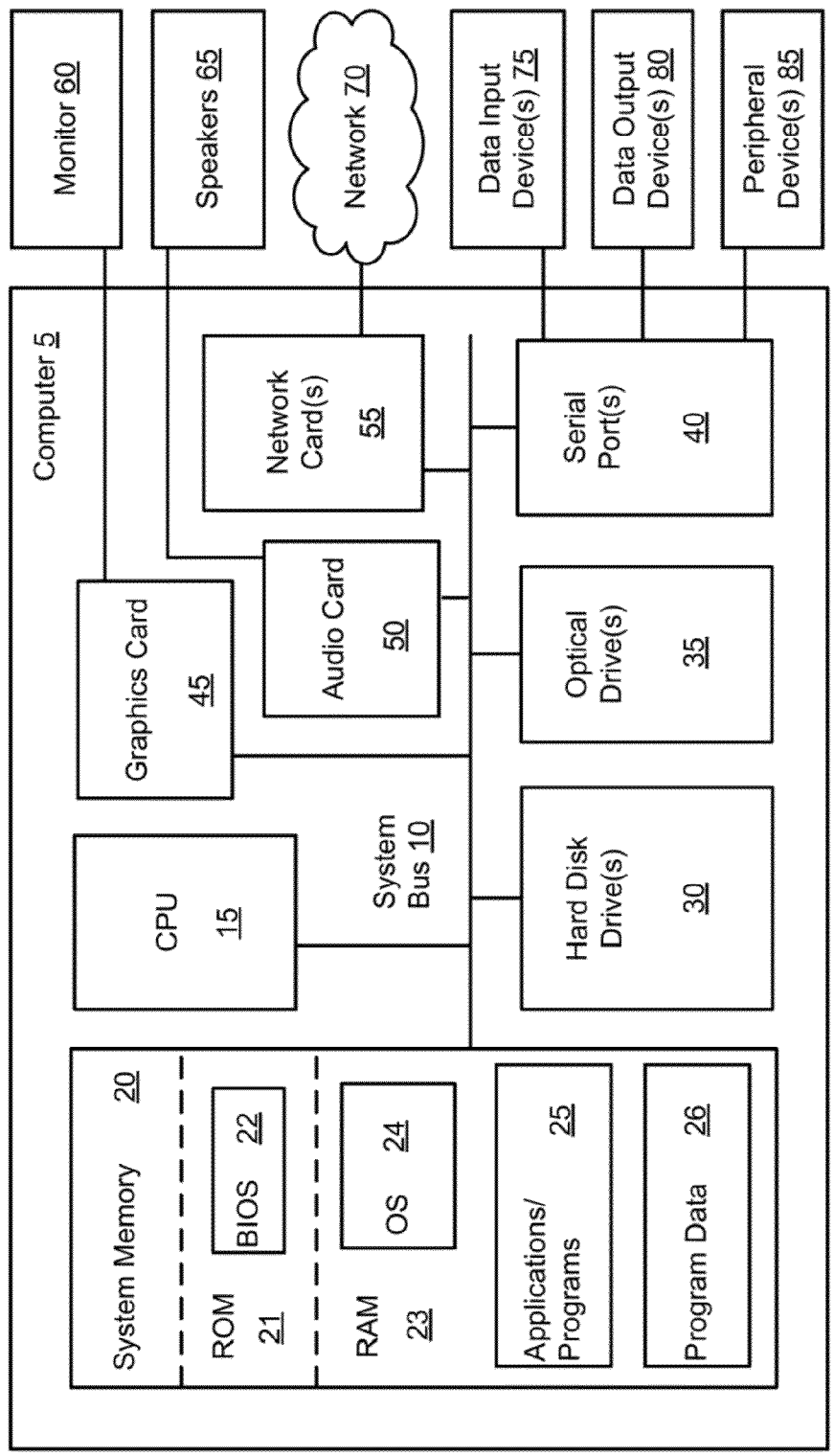
FIG. 13 illustrates one example embodiment of a computer system.

FIG. 13 depicts one example embodiment of a computer system 5, such as a personal computer or network server, suitable for implementing the applications server 105 that hosts the service booking application 110. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of the computer system 5, such as during start-up. RAM 23 stores an operating system 24 (OS), such as Windows® XP Professional or other type of operating system, that is responsible for management and coordination of processes and allocation and sharing of hardware resources in computer system 5. System memory 20 also stores applications and programs 25, such as application 110. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner- and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting the computer system 5 to a network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies, such as infrared, radio, and microwave, are included in the definition of the medium.

It should be appreciated that financial structures, systems and methodologies described herein are not limited to financing of promotional services, but in alternative implementations can be used in financing of other services and goods. In the development of any such implementations, numerous implementation-specific decisions must be made in order to achieve the developer's specific goals, and that these specific goals will vary from one implementation to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for promoting and booking services, the method comprising:
   hosting a service booking application that provides at least one user interface for searching and booking available services;
   storing in a database information about a secured financing transaction pursuant to which a service promoter provides funds to a service provider in exchange for promoting to the at least one user interface a plurality of service offers from the service provider,
   wherein the database is in communication with a processor, the stored information includes at least the amount of provided funds, the number of available service offers, and the cost of each service offer to the service promoter, and the plurality of service offers includes one or more types of services;
   promoting one or more service offers, from the plurality of available service offers, at a variable discount price that is optimized for profit generation, wherein the discount price of the service offer is varied based on a total number of remaining available service offers, a number of remaining available service offers of each type of service, an expected demand for service offers at various price levels, an opportunity cost of providing the service offer, and a booking volume-forecast based on at least the traffic volume from the at least one user interface;
   booking, via the processor, a service appointment for a user with a service provider based on a promoted service offer in response to an indication from the at least one user interface;
   adjusting the number of available service offers in the database based on the number of service offers corresponding to the number of booked service appointments booked by the at least one user interface, wherein the variable discount price is re-optimized periodically as service appointments are booked from the at least one user interface; and
   deducting from the amount of provided funds the amount of total cost of service offers corresponding to the number of booked service appointments.

2. The method of claim 1, wherein promoting one or more service offers from the plurality of service offers includes promoting one or more service offers at a selected price, wherein the selected price for the service offer is higher than the cost of the service offer to the service promoter, but lower than the price of the service offered by the service provider directly to users.

3. The method of claim 1, wherein the discount price of the service offer is also varied based on a maximum allowed discount.

4. The method of claim 1, further comprising dynamically increasing the number of promoted service offers of one type of service and proportionally decreasing the number of promoted service offers of another type of service based on the total number of remaining available service offers of each type of service.

5. The method of claim 1, wherein promoting one or more service offers from the plurality of service offers further includes promoting the one or more service offers via an online advertising marketplace accessible via a network.

6. The method of claim 1, wherein promoting one or more service offers from the plurality of service offers includes generating promotional certificates for one or more services based on a user's service booking history and electronically sending the promotional certificates to the one or more users.

7. The method of claim 1, wherein the secured financing transaction is a collateral-secured loan from the service promoter to the service provider, wherein the collateral for the loan includes a plurality of service offers from the service provider.

8. The method of claim 1, wherein the secured financing transaction is an advanced purchase by the service promoter of a plurality of service offers from the service provider.

9. A computer-implemented system for promoting and booking services, the system comprising:
   a service booking application host that provides at least one user interface for searching and booking available services;
   a data storage component for storing information about a secured financing transaction pursuant to which a service promoter provides funds to a service provider in exchange for promoting to the at least one user interface a plurality of service offers from the service provider, wherein the plurality of service offers includes one or more types of services and wherein the stored information includes at least the amount of provided funds, the number of available service offers, and the cost of each service offer to the service promoter; and
   a processor coupled to the data storage component, the processor being configured to:
   promote one or more service offers, from the plurality of available service offers, at a variable discount price that is optimized for profit generation, wherein the discount price of the service offer is varied based on a total number of remaining available service offers, a number of remaining available service offers of each type of service, an expected demand for service offers at various price levels, an opportunity cost of providing the service offer, and a booking volume-forecast based on at least the traffic volume from the at least one user interface;
   book a service appointment for a user with a service provider based on a promoted service offer in response to an indication from the at least one user interface;
   adjust the number of available service offers in the database based on the number of service offers corresponding to the number of booked service appointments booked by the at least one user interface, wherein the variable discount price is re-optimized periodically as service appointments are booked from the at least one user interface; and
   deduct from the amount of provided funds the amount of total cost of service offers corresponding to the number of booked service appointments.

10. The system of claim 9, wherein to promote one or more service offers from the plurality of service offers, the processor being further configured to promote one or more service offers at a discount price, wherein the discount price for the service offer is higher than the cost of the service offer to the service promoter, but lower than the price of the service offered by the service provider directly to users, and wherein the difference between the discount price and the cost of the service offer is a profit margin of the service promoter.

11. The system of claim 9, wherein the discount price is also varied based on a maximum allowed discount.

12. The system of claim 9, wherein the processor is further configured to dynamically increase the number of promoted service offers of one type of service and proportionally decrease the number of promoted service offers of another type of service based on the total number of remaining available service offers of each type of service.

13. The system of claim 9, wherein to promote one or more service offers from the plurality of service offers, the processor being further configured to promote the one or more service offers via an online advertising marketplace accessible via a network.

14. The system of claim 9, wherein to promote one or more service offers from the plurality of service offers, the processor being further configured to generate promotional certificates for one or more services based on a user's service booking history and electronically send the promotional certificates to the one or more users.

15. The system of claim 9, wherein the secured financing transaction is a collateral-secured loan from the service promoter to the service provider, wherein the collateral for the loan includes a plurality of service offers from the service provider.

16. The system of claim 9, wherein the secured financing transaction is an advanced purchase by the service promoter of a plurality of service offers from the service provider.

17. A computer-implemented method for financing promotional services, the method comprising:
hosting a service booking application that provides a web-based service provider interface for requesting funding from a service promoter and at least one user interface for searching and booking available services;
receiving through the web-based service provider interface a request from a service provider for funding from the service promoter in exchange for promoting to the at least one user interface a plurality of service offers from the service provider;
analyzing booking records associated with the service provider and maintained by the service promoter, wherein the booking records include at least information about the number of service appointments booked by the at least one user interface for service offers from the service provider and the prices paid by users for the booked service appointments from the service provider;
determining via a processor and based on the analysis of the booking records, the amount of funds to be provided by the service promoter to the service provider, the number of service offers to be promoted by the service promoter, and the cost of each service offer to the service promoter;
executing a secured financing transaction between the service promoter and the service provider pursuant to which the service promoter transfers the determined amount of funds to the service provider in exchange for promoting to the at least one user interface the determined number of service offers from the service provider;
storing in a database information about the executed secured financing transaction, wherein the stored information includes the amount of provided funds, the determined number of available service offers, and the cost of each service offer to the service promoter;
promoting one or more service offers from the plurality of available service offers, at a variable discount price that is optimized for profit generation, wherein the discount price of the service offer is varied based on a total number of remaining available service offers, a number of remaining available service offers of each type of service, an expected demand for service offers at various price levels, an opportunity cost of providing the service offer, and a booking volume-forecast based on at least the traffic volume from the at least one user interface;
booking, via the processor, a service appointment for a user with a service provider based on a promoted service offer in response to an indication from the at least one user interface;
decreasing the number of available service offers in the database by the number of service offers corresponding to the number of booked service appointments booked by the at least one user interface, wherein the variable discount price is re-optimized periodically as service appointments are booked from the at least one user interface; and
deducting from the amount of provided funds the amount of total cost of service offers corresponding to the number of booked service appointments.

18. The method of claim 17, wherein the web-based service provider interface includes a calendar interface for creating a schedule of available services offers by the service provider, wherein the schedule of available services offers identifies one or more of the date and time of service, the type of service, the service provider, and a selected price of each service offer determined by the service promoter.

19. The method of claim 17, wherein determining, based on the analysis of the booking records, the number of service offers to be promoted by the service promoter includes estimating, based on the analysis of the booking records, the number of service offers that will be booked by users within a specific time period.

20. The method of claim 17, wherein determining, based on the analysis of the booking records, the number of service offers to be promoted by the service promoter and the cost of each service offer to the service promoter includes determining the number of service offers of different types of services and the cost of each service offer of each type of service.

21. The method of claim 17, wherein the secured financing transaction includes one of: a collateral-secured loan from the service promoter to the service provider, wherein the collateral for the loan includes a plurality of service offers from the service provider; and an advanced purchase by the service promoter of a plurality of service offers from the service provider.

22. A computer-implemented system for financing promotional services, the system comprising:
a service booking application host that provides a web-based service provider interface for requesting funding from a service promoter and at least one user interface for searching and booking available services;
a data storage component for storing booking records associated with a service provider, wherein the booking records include at least information about the number of service appointments booked by the at least one user interface for service offers from the service provider and the prices paid by users for the booked service appointments from the service provider; and
a processor coupled to the data storage component and configured to:
receive through the web-based service provider interface a request from a service provider for funding from the service promoter in exchange to promote to the at least one user interface a plurality of service offers from the service provider;
analyze the booking records associated with the service provider;
determine, based on the analysis of the booking records, the amount of funds to be provided by the service promoter to the service provider, the number of service offers to be promoted by the service promoter, and the cost of each service offer to the service promoter;
execute a secured financing transaction between the service promoter and the service provider pursuant to which the service promoter transfers the determined amount of funds to the service provider in exchange to promote to the at least one user interface the determined number of service offers from the service provider;

store in the data storage component information about the executed secured financing transaction, wherein the stored information includes the amount of provided funds, the determined number of available service offers, and the cost of each service offer to the service promoter;

promote one or more service offers from the plurality of available service offers at a variable discount price that is optimized for profit generation, wherein the plurality of available service offers includes one or more types of services, and wherein the discount price of the service offer is varied based on a total number of remaining available service offers, a number of remaining available service offers of each type of service, an expected demand for service offers at various price levels, an opportunity cost of providing the service offer, and a booking volume-forecast based on at least the traffic volume from the at least one user interface;

book a service appointment for a user with a service provider based on a promoted service offer in response to an indication from the at least one user interface;

decrease the number of available service offers in the database by the number of service offers corresponding to the number of booked service appointments booked by the at least one user interface, wherein the variable discount price is re-optimized periodically as service appointments are booked from the at least one user interface; and deduct from the amount of provided funds the amount of total cost of service offers corresponding to the number of booked service appointments.

23. The system of claim 22, wherein the web-based service provider interface includes a calendar interface for creating a schedule of available services offers by the service provider, wherein the schedule of available services offers identifies one or more of the date and time of service, the type of service, the service provider, and a discounted price of each service offer determined by the service promoter.

24. The system of claim 22, wherein to determine, based on the analysis of the booking records, the number of service offers to be promoted by the service promoter, the processor being further configured to estimate, based on the analysis of the booking records, the number of service offers that will be booked by users within a specific time period.

25. The system of claim 22, wherein to determine, based on the analysis of the booking records, the number of service offers to be promoted by the service promoter and the cost of each service offer to the service promoter, the processor being further configured to determine the number of service offers of different types of services and the cost of each service offer of each type of service.

26. The system of claim 22, wherein the secured financing transaction includes one of: collateral-secured loan from the service promoter to the service provider, wherein the collateral for the loan includes a plurality of service offers from the service provider; and an advanced purchase by the service promoter of a plurality of service offers from the service provider.

* * * * *